United States Patent Office 3,632,647
Patented Jan. 4, 1972

3,632,647
PROCESSES FOR PREPARING AND/OR PURIFYING CHLORTETRACYCLINE HYDROCHLORIDE AND CHLORTETRACYCLINE NEUTRAL BASE
Sheldon B. Greenbaum, Livingston, and Richard Griffith, Red Bank, N.J., and Howard C. Klein, Brooklyn, N.Y., assignors to Diamond Shamrock Corporation, Cleveland, Ohio
No Drawing. Filed June 17, 1968, Ser. No. 737,372
Int. Cl. C07c 127/00
U.S. Cl. 260—559 AT
3 Claims

ABSTRACT OF THE DISCLOSURE

Chlortetracycline hydrochloride and chlortetracycline neutral base are prepared and/or purified by (1) dissolving chlortetracycline hydrochloride in an aqueous urea, thiourea or water soluble alkyl urea solution or (2) by dissolving chlortetracycline neutral base in an aqueous solution of urea, thiourea or water soluble alkyl urea and hydrochloric acid to obtain an aqueous chlortetracycline hydrochloride-urea, thiourea or water soluble alkyl urea solution which can then be clarified to remove color or any insoluble impurities. The aqueous solution is then treated (a) with hydrochloric acid and sodium chloride to precipitate chlortetracycline hydrochloride or (b) with a water soluble basic material to precipitate chlortetracycline neutral base or (c) water can be volatilized from the solution to obtain a water soluble solid chlortetracycline hydrochloride composition.

BACKGROUND OF THE INVENTION

This invention relates to processes for preparing and/or purifying chlortetracycline hydrochloride and chlortetracycline neutral base using an aqueous chlortetracycline hydrochloride-urea, thiourea or water soluble alkyl urea solution.

Chlortetracycline hydrochloride and chlortetracycline neutral base, which is chlortetracycline, have been prepared and/or purified in the past by processes using organic solvents and/or strong bases, e.g., alkali materials, alkaline materials and the like. The disadvantages of processes using organic solvents are well known. Organic solvents particularly ketones, alcohols, ethers, hydrocarbons and the like are hazardous to use and recover. Use and recovery of organic solvents is costly in that special equipment is required and recovery of solvents is not complete. Use of strong bases such as alkali or alkaline materials in chlortetracycline hydrochloride and/or chlortetracycline neutral base processes is also undesirable in that use of these alkaline materials accelerates decomposition of the chlortetracycline. Consequently, procedures involving chlortetracycline hydrochloride and/or chlortetracycline neutral base particularly purification procedures, should be avoided wherein localized alkaline conditions are encountered or highly alkaline solutions, that is, solutions having a pH of 10 or higher are used. Thus, there is a definite need for processes for preparing and/or purifying chlortetracycline hydrochloride and/or chlortetracycline neutral base wherein organic solvents and/or alkaline conditions can be eliminated.

It is an object of this invention to provide processes for preparing chlortetracycline hydrochloride or chlortetracycline neutral base. Another object is to provide processes for preparing purified chlortetracycline hydrochloride or chlortetracycline neutral base. Still another object is to provide processes for preparing solid water soluble chlortetracycline hydrochloride compositions. Other objects of this invention will become apparent from the detailed description and specific examples given herein. However, it is intended that the detailed description and specific examples do not limit this invention but merely indicate preferred embodiments.

SUMMARY OF THE INVENTION

The objects of this invention are accomplished by (1) dissolving chlortetracycline hydrochloride in an aqueous solution of urea, thiourea or water soluble alkyl urea or (2) by dissolving chlortetracycline neutral base in an aqueous solution of urea, thiourea or water soluble alkyl urea and adding sufficient hydrogen chloride in the form of hydrochloric acid to obtain an aqueous chlortetracycline hydrochloride-urea, thiourea or water soluble alkyl urea solution having a pH of 3.5 or less and thereafter (b) clarifying the resulting aqueous solution to remove color or any insoluble impurities. The quantities of materials used are from about 2 to about 6 parts by weight of urea, thiourea or water soluble alkyl urea and from about 4 parts by weight to about 17 parts by weight of water per part by weight of chlortetracycline hydrochloride or chlortetracycline neutral base with the proviso that sufficient hydrogen chloride is present in the solution to reduce the pH to at least 3.5 when chlortetracycline neutral base is used and the base is converted to chlortetracycline hydrochloride. Hydrogen chloride can be conveniently added in the form of 18% by weight or 36% by weight hydrochloric acid when required. The resulting aqueous chlortetracycline hydrochloride-urea, thiourea or water soluble alkyl urea solution has a pH of from about 2.5 to about 3.5, that is, about 3.0±0.5. The aqueous chlortetracycline hydrochloride-urea, thiourea or water soluble alkyl urea solution is prepared and clarified at a temperature of from about 15 to about 30° C. Clarification of the aqueous chlortetracycline hydrochloride-urea, thiourea or water soluble alkyl urea solution can be effected by filtration, centrifugation, decantation or any other procedure wherein the clear aqueous chlortetracycline hydrochloride-urea, thiourea or water soluble alkyl urea solution is separated from water insoluble materials such as impurities. Clarification also includes procedures wherein decolorizing agents are added to the solution and the decolorizing agents are removed to obtain a clarified solution having improved color. An activated carbon such as a decolorizing carbon or a filter aid such as a diatomaceous earth can be used in the clarification. The solution can be clarified by filtration through paper, cloth, screen, fixed filter bed or the like.

Likewise, the above process can be used to prepare chlortetracycline hydrochloride from chlortetracycline neutral base and chlortetracycline neutral base from chlortetracycline hydrochloride without purification, that is, the process can be used to prepare the hydrochloride from the neutral base or vice versa.

The present invention employs aqueous urea, thiourea, or water soluble alkyl urea solutions. Although the theory of the present invention is not completely understood, it appears that the structure of water and its solvent properties are altered by addition of urea, thiourea or water soluble alkyl urea. The resulting aqueous urea, thiourea or water soluble alkyl urea solution dissolves about 4% by weight of chlortetracycline hydrochloride at room temperature whereas water dissolves only about 1.5% by weight of chlortetracycline hydrochloride. Thus, although aqueous urea, thiourea or water soluble alkyl urea solutions are known, i.e., prepared and used as syrups, lotions, etc. of the antibiotic, it was not realized that aqueous urea, thiourea or water soluble alkyl urea solutions permits use of higher concentrations of chlortetracycline hydrochloride and chlortetracycline neutral base in processes for the preparation and/or purification of chlortetracycline hydrochloride and chlortetracycline neutral base. Consequently, the processes of the present invention require less water than conventional aqueous processes. Thus, there is a marked reduction in the working volume of the aqueous solutions used, that is, the volume can be reduced to one-third of the volume required when the aqueous solution does not contain urea, thiourea or water soluble alkyl urea.

DETAILED DESCRIPTION

After clarification, water present in the clarified solution can be volatilized to obtain a water soluble solid composition which contains from about 13 to about 16 parts by weight of chlortetracycline hydrochloride per 100 parts by weight of total solids. The balance of the solid composition is inert materials such as urea, thiourea or water soluble alkyl urea and/or its by-products. Water can be volatilized from the clarified solution at a temperature of from about 30 to about 150° C. using atmospheric or sub-atmospheric pressures. Volatilization can be carried out in any type of suitable equipment such as process equipment used for drying, evaporation, distillation or the like.

Chlortetracycline hydrochloride can be precipitated from the clarified solution by introducing sufficient hydrochloric acid to adjust the pH of the clarified solution to from about 0 to about 1.5 thereby precipitating chlortetracycline hydrochloride from the solution. If desired, sodium chloride can be used in conjunction with hydrochloric acid to precipitate chlortetracycline hydrochloride. The filtrate is tested for completeness of chlortetracycline hydrochloride precipitation by the addition of hydrochloric acid and/or sodium chloride to the filtrate. If the filtrate remains clear and unchanged after the acid and/or salt addition, precipitation of chlortetracycline hydrochloride is complete. Precipitated chlortetracycline hydrochloride can then be recovered from the solution by filtration or other suitable procedure for separating solid chlortetracycline hydrochloride from solution. After recovery, the solid chlortetracycline hydrochloride can be washed with a solvent, reslurried in water and then recovered, dried or processed by any combination thereof. Any slight haze produced by dissolving the purified or processed chlortetracycline hydrochloride in water can be discharged by addition of a small amount of cetyl pyridinium chloride to the resulting chlortetracycline hydrochloride solution.

Chlortetracycline neutral base can be precipitated from the clarified aqueous chlortetracycline hydrochloride-urea, thiourea or water soluble alkyl urea solution by introducing sufficient water soluble basic material to adjust the pH of the clarified solution from about 4.5 to about 6.0 thereby precipitating chlortetracycline neutral base from the solution. Precipitated chlortetracycline neutral base can then be recovered from the solution by filtration or other suitable procedure for separating solid chlortetracycline neutral base from the solution. After recovery, the solid chlortetracycline neutral base can be washed with a solvent, reslurried in water and then recovered, dried or processed in any conventional manner.

In the place of urea in the aqueous solution, there can be used thiourea, water soluble alkyl urea derivatives, e.g., monomethyl urea, dimethyl urea, monoethyl urea and the like as well as mixtures thereof.

Water soluble basic materials, which can be used to precipitate chlortetracycline neutral base include water soluble alkali materials such as sodium hydroxide, potassium hydroxide, lithium hydroxide; alkali carbonates and alkali bicarbonates, e.g., sodium carbonate, potassium carbonate, sodium bicarbonate, lithium carbonate and the like; water soluble nitrogen containing bases such as ammonia, alkylamines such as monomethylamine, diethylamine, trimethylamine, alkanolamines such as monoethanolamine, diethanolamine, triethanolamine and the like. These basic materials are used in the form of dilute aqueous solutions and are added with vigorous addition to minimize the formation of localized highly basic or alkaline conditions.

The processes of the present invention are carried out at a pH of from about 0 to about 6.0. Since highly alkaline conditions are not encountered, glass lined equipment or equipment lined with acid resistant plastics such as polyvinyl chloride, fluorine containing polymers or the like can be used. The same equipment can be used to produce chlortetracycline hydrochloride, chlortetracycline neutral base and water soluble chlortetracycline hydrochloride compositions. Further, the same equipment can be used to produce one or more of these products. Since there is a marked reduction in the working volume of the aqueous solutions used in the processes disclosed in this invention, the working volume can be reduced to one-third of the volume required when the aqueous solution does not contain urea, thiourea or water soluble alkyl urea. Thus, the size of the equipment can be reduced accordingly.

Purified chlortetracycline hydrochloride, chlortetracycline neutral base and water soluble compositions thereof produced by the process of the present invention have numerous uses. Chlortetracycline hydrochloride is used as a pharmaceutical and as an animal feed additive. Chlortetracycline neutral base is useful as an intermediate in the manufacture of chlortetracycline sulfate and chlortetracycline bisulfate which are water soluble derivatives useful in the preparation of liquid pharmaceutical formulations such as syrups, emulsions and the like. Water soluble compositions of chlortetracycline hydrochloride produced by the process of this invention are useful as additives for use in animal feeds and in animal drinking waters.

For a fuller understanding of the nature and objects of this invention, reference may be made to the following examples. These examples are given to illustrate the invention and are not to be construed in a limiting sense. All parts, proportions, percentages and quantities are by weight unless otherwise indicated. The terms g. and ° C. are used to indicate grams and degrees centigrade respectively in the examples.

Example I

This example is outside the scope of the present invention in that urea, thiourea or water soluble alkyl urea was not used in the procedure.

50 parts by weight of crude chlortetracycline hydrochloride, which assayed ca 81.7% by weight or 817 $\gamma$/mg., was added to 260 parts by weight of water and agitated for 0.5 hour at 25° C. to obtain a solution having a pH of 3.0. The suspension was centrifuged to remove 46.3 parts by weight of undissolved materials, which assayed 890 $\gamma$/mg. chlortetracycline hydrochloride, leaving a clear effluent. This effluent was acidified to a pH of 0 by addition of 400 parts by weight of 18% hydrochloric acid. 200 parts by weight of sodium chloride was then added to precipitate chlortetracycline hydrochloride. The resulting mixture was stirred at 15° C. for 20 hours to complete precipitation of chlortetracycline hydrochloride. Precipitated chlortetracycline hydrochloride crystals were filtered off from the mixture and were slurried in 5 parts by weight of water. Chlortetracycline hydrochloride crystals were recovered from the slurry by filtration and were dried at 25° C. in vacuo to obtain 1.04 parts by weight of a reddish solid, which assayed 257 $\gamma$/mg. as chlortetracycline hydrochloride and represented a yield of 0.5%. Although the purity of the chlortetracycline hydrochloride crystals, which were recovered, was improved by the removal of undissolved materials by centrifugation, the crystals were brownish in color and only partially dissolved in water to form a solution containing a flocculent residue.

The following examples are within the scope of the present invention and demonstrate the usefulness of urea, thiourea or water soluble alkyl urea in the processes disclosed in the present invention.

Example II 50 parts by weight of crude chlortetracycline hydrochloride, which was 81.7% by weight active and assayed 817 γ/mg., was added to a solution of 260 parts by weight of urea in 260 parts by weight of water and was agitated for 0.5 hour at 25° C. to dissolve the chlortetracycline hydrochloride. The resulting solution, which contained undissolved impurities and had a pH of 3.0 as is, was centrifuged through a Filtercel bed to obtain a clear effluent which had a pH of 3.0 as is. The clear effluent was acidified to a pH of 0.5 by addition of 400 parts by weight of 18% by weight hydrochloric acid. 200 parts by weight of sodium chloride was then added to the acidified effluent and the resulting mixture was agitated at 15° C. for 20 hours to precipitate chlortetracycline hydrochloride. The precipitated chlortetracycline hydrochloride crystals were recovered by filtration and were slurried in 100 parts by weight of water at 25° C. The slurry was then filtered to recover the chlortetracycline hydrochloride crystals and the crystals were dried at 25° C. in vacuo to obtain 41 parts by weight of purified chlortetracycline hydrochloride, which assayed 956 γ/mg. and represented a yield of 95.6%. A slight turbidity present after dissolving the purified hydrochloride in water was discharged by adding a small amount of cetyl pyridinium chloride to the chlortetracycline hydrochloride solution.

Example III

One hundred parts by weight of 86% commercial chlortetracycline hydrochloride, 520 parts of urea and 520 parts by weight of water were stirred at 25° C. for 0.75 hour to obtain an aqueous chlortetracycline hydrochloride-urea solution containing a small amount of suspended impurities and having a pH of 3.0 as is. The insoluble impurities were removed by centrifugation to obtain a clear effluent. 405 parts by weight of sodium chloride and a cold solution of 850 parts by weight (730 parts by volume) concentrated hydrochloric acid in 850 parts by weight water were added to the clear effluent to adjust the pH of the effluent to 0.5 or less and to precipitate chlortetracycline hydrochloride. The resulting mixture was stirred for four hours at 15° C. and then filtered to recover chlortetracycline hydrochloride crystals. The light yellow chlortetracycline hydrochloride crystals were digested in 300 parts by weight of water, recovered by filtration, washed and vacuum dried overnight at 25° C. The yield was 83.2 parts by weight of pure chlortetracycline hydrochloride. This yield represented a recovery of 96.8% of the available chlortetracycline hydrochloride.

Example IV

The process of Example III was repeated with the exception that 5 parts by weight of Norite SGIIX (decolorizing carbon) was added before centrifugation. A yield of 82.6 parts by weight of 100% pure chlortetracycline hydrochloride (N.F. grade) was obtained. This yield represented 95.8% of theory.

Example V

The process of Example IV was repeated using 447 parts by weight of urea and 447 parts by weight of water. A yield of 78.0 parts by weight of purified chlortetracycline hydrochloride or 90.5% of the available chlortetracycline hydrochloride was obtained.

Example VI

The process of Example IV was repeated using a solution containing 600 parts by weight of urea and 600 parts by weight of water to obtain an aqueous solution having a pH of 3.0. After centrifugation, the effluent was treated with 465 parts by weight of salt, 985 parts by weight (840 parts by volume) concentrated hydrochloric acid and 985 parts by weight of water to adjust the pH of the effluent to 0 and to precipitate 80.1 parts by weight purified chlortetracycline hydrochloride or 93.2% of the available chlortetracycline hydrochloride.

Example VII

Ninety-three parts by weight of 86% commercial chlortetracycline hydrochloride, 246 parts by weight of thiourea and 1300 parts by weight of water were stirred one hour to obtain a mixture having a pH of 3.0; the mixture filtered to obtain a clear solution. Chlortetracycline hydrochloride in the solution was precipitated by adding 286 parts by weight of concentrated hydrochloric acid to obtain a chlortetracycline hydrochloride slurry having a pH of 0. This slurry was then filtered to recover chlortetracycline hydrochloride. 59 parts by weight of pure chlortetracycline hydrochloride or 74% of the available chlortetracycline hydrochloride was recovered.

Example VIII

The following tests demonstrate the usefulness of water soluble alkyl ureas as solubilizing agents for chlortetracycline hydrochloride:

(a) Monomethyl urea: 1.82 part by weight of 96% chlortetracycline hydrochloride was dissolved in a solution of 10 parts by weight of monomethyl urea and 10 parts by weight of water. A clear solution was obtained.

(b) Dimethyl urea: 4.0 parts by weight of 96% chlortetracycline hydrochloride dissolved in a solution of 30 parts by weight of dimethyl urea and 30 parts by weight of water. A clear solution was obtained.

Example IX 240 parts by weight of 96% commercial chlortetracycline hydrochloride, 1262.5 parts by weight of urea and 1440 parts by weight of water were stirred five minutes at room temperature to obtain a clear solution having a pH of 3.0. The resulting clear solution was adjusted to a pH of 5.5 by adding dilute sodium hydroxide solution, diluted with 2600 parts of water and stirred five hours at room temperature to precipitate chlortetracycline neutral base. Centrifugation and vacuum drying at room temperature gave 200.4 parts by weight of chlortetracycline neutral base having a M.P. 173–5° and representing a yield of 91.5% of theory.

Example X 12 parts by weight of 83% commercial chlortetracycline hydrochloride, 29 parts by weight of thiourea and 200 parts by weight of water were stirred until a substantially clear solution having a pH of 2.8 was obtained. A small amount of impurities was removed by filtration; solution pH was then adjusted to 5.5 with aqueous dilute sodium hydroxide solution to precipitate chlortetracycline neutral base. The resulting slurry of chlortetracycline neutral base was stirred two hours at room temperature. Centrifugation to recover chlortetracycline base and digestion of the resulting cake with 35 parts by weight of methanol gave 8.3 parts by weight of purified chlortetracycline neutral base having a M.P. of 172–5° C. and representing a yield of 88.5% theory.

Example XI 40 parts by weight of chlortetracycline hydrochloride prepared from 86% commercial chlortetracycline hydrochloride by urea purification was stirred one half hour with 208 parts by weight of urea in 208 parts by weight of water to obtain a clear solution having a pH of 3.0. The clear solution was adjusted to a pH of 5.5 with dilute sodium hydroxide solution, diluted with 208 parts by weight of water, stirred 3.5 hours at room temperature to precipitate chlortetracycline neutral base which was then filtered off, washed and vacuum dried at room temperature. A yield of 33.4 parts by weight of chlortetracycline neutral base or 90% of theory was obtained.

Example XII

A chlortetracycline neutral base suspension containing 93 parts by weight of brown impure chlortetracycline neutral base, 520 parts by weight of urea and 520 parts by weight of water was stirred and adjusted to a pH of 3.0 by the addition of 18% hydrochloric acid. The neutral base dissolved to form a clear solution of chlortetracycline hydrochloride shortly after the pH was adjusted to 3.0. This solution was treated with 200 parts salt, stirred one half hour with 5 parts by weight of Norit SGII X and the mixture centrifuged. The clear effluent was treated with 1 part by weight of Cepacol chloride (1-hexadecyl-pyridinium chloride), diluted with a solution of 420 parts by weight (365 parts by volume) of concentrated hydrochloric acid in 420 parts by weight of water. 200 parts by weight of salt was then added to obtain a mixture having a pH of 0 as is. The mixture stirred for four hours at 20° C. to precipitate chlortetracycline hydrochloride. Crystalline yellow chlortetracycline hydrochloride was filtered off. A 74.8% yield of chlortetracycline hydrochloride was obtained.

Example XIII 50 parts by weight of methanol-washed crude chlortetracycline hydrochloride, which was 77.4% by weight active and assayed 744 γ/mg., was added to a solution of 260 parts by weight of urea in 260 parts by weight of water and was agitated at 25° C. for 0.5 hour to dissolve the chlortetracycline hydrochloride. The resulting aqueous chlortetracycline hydrochloride-urea solution had a pH of 3.0. 2.5 parts by weight of Norit SGII X was added to the mixture. The mixture was then agitated for 0.5 hour and centrifuged as described in Example II above to obtain clear effluent. The resulting clear effluent had a pH of 3.0 as is. One part by weight of cetyl pyridinium chloride was dissolved in the effluent to discharge a slight haze and then 400 parts by weight of 18% by weight hydrochloric acid was added to precipitate the chlortetracycline hydrochloride. The resulting mixture had a pH of 0.5. 202 parts by weight of sodium chloride was then added to the mixture and the mixture agitated at 15° C. for 20 hours to precipitate chlortetracycline hydrochloride. Chlortetracycline hydrochloride crystals were recovered by filtration, slurried in 100 parts by weight of water, recovered from the slurry by filtration, washed with water and dried at 25° C. in vacuo. 40.0 parts by weight of purified chlortetracycline hydrochloride crystals, which represented a yield of 96% and assayed 961 γ/mg., were obtained.

Example XIV 5 parts by weight of crude chlortetracycline hydrochloride, which was 90% by weight active and assayed 900 γ/mg., was dissolved in a solution containing 30 parts by weight of urea in 30 parts by weight of water. The solution was then agitated for 0.5 hour at 25° C. with 0.5 part by weight of Norit SGII X and filtered to obtain a clear aqueous chlortetracycline hydrochloride-urea solution having a pH of 3.0. The solution was evaporated to dryness at 50° C. in vacuo to obtain a solid composition which contained 13% by weight chlortetracycline hydrochloride. 2.64 parts by weight of this solid composition was dissolved in 19 parts by weight of water to obtain an aqueous solution containing 1.95% by weight of chlortetracycline hydrochloride. The chlortetracycline hydrochloride solution remained clear and unchanged for 24 hours.

Example XV 33 parts by weight of 90% active chlortetracycline hydrochloride, 157.8 parts by weight urea, 180 parts by weight water were stirred at 25° C. for one hour. 3.0 parts by weight of Norit SGII X was then added. The resulting mixture was stirred for 0.5 hour and filtered to obtain a clear chlortetracycline hydrochloride-urea solution having a pH of 3.0. 0.25 part by weight of Arquad C-50, a 50% active N-lauryl trimethyl ammonium chloride solution, was added to 114 parts by weight of the above solution and the solution was vacuum dried to obtain a solid composition which contained 12.8% by weight chlortetracycline hydrochloride and assayed 128 γ/mg. chlortetracycline hydrochloride. A clear solution of the solid composition was obtained by dissolving 2.6 parts by weight of the solid in 7.4 parts by weight of water. This solution contained 4% by weight chlortetracycline hydrochloride.

Example XVI 73.2 parts by weight of technical grade chlortetracycline hydrochloride, which was 91.5% active and assayed 915 γ/mg., 315.6 parts by weight urea and 360 parts by weight of water, were agitated at 25° C. for one hour and then centrifuged through a Filtercel bed to obtain a clear effluent having a pH of 3.0 as is. 0.76 parts by volume of Arquad C-50 was added to 200 parts by volume (229 parts by weight) of this effluent to aid in obtaining a solid composition which will dissolve in water to form a solution having high clarity. The resulting solution was then spray dried to obtain a solid composition in the form of a fine yellow powder which assayed 146 γ/mg. chlortetracycline hydrochloride. A perfectly clear 4% by weight chlortetracycline hydrochloride solution was obtained by dissolving the solid composition in water. This 4% by weight solution is a desirable concentration for automatic proportioning dispersers for drinking water for fowl during disease treatment. A solution of chlortetracycline hydrochloride in water ordinarily reaches saturation at about 1.4% by weight chlortetracycline hydrochloride which is to dilute for such a purpose.

What is claimed is:

1. In a process for removal of impurities from a member of the group consisting of chlortetracycline neutral base and chlortetracycline hydrochloride, the steps which comprise
   (a) dissolving said member in a solution of water with one or more members of the group consisting of urea, thiourea, and water soluble alkyl urea, with the proviso that when said chlortetracycline neutral base is used, sufficient hydrogen chloride is present in said solution to reduce the pH to at least 3.5;
   (b) purifying said solution containing the dissolved chlortetracycline by removal of insoluble impurities and color impurities, said color impurities being removed by a decolorizing agent;
   (c) introducing hydrogen chloride in the form of hydrochloric acid to said purified solution in an amount sufficient to precipitate chlortetracycline hydrochloride from said solution; and thereafter
   (d) recovering said precipitate from said solution.

2. In a process for removal of impurities from a member of the group consisting of chlortetracycline neutral base and chlortetracycline hydrochloride, the steps which comprise
   (a) dissolving said member in a solution of water with one or more members of the group consisting of urea, thiourea, and water soluble alkyl urea, with the proviso that when said chlortetracycline neutral base is used, sufficient hydrogen chloride is present in said solution to reduce the pH to at least 3.5;
   (b) purifying said solution containing the dissolved chlortetracycline by removal of insoluble impurities and color impurities, said color impurities being removed by a decolorizing agent;
   (c) introducing hydrogen chloride in the form of hydrochloric acid and sodium chloride to said purified solution in amounts sufficient to precipitate chlortetracycline hydrochloride from said solution; and thereafter
   (d) recovering said precipitate from said solution.

3. In a process for removal of impurities from a member of the group consisting of chlortetracycline neutral base and chlortetracycline hydrochloride, the steps which comprise
   (a) dissolving said member in a solution of water with one or more members of the group consisting of urea, thiourea, and water soluble alkyl urea, with the proviso that when said chlortetracycline neutral base is used, sufficient hydrogen chloride is present in said solution to reduce the pH to at least 3.5;

(b) purifying said solution containing the dissolved chlortetracycline by removal of insoluble impurities and color impurities, said color impurities being removed by a decolorizing agent;

(c) introducing a water soluble basic material selected from the group consisting of alkali hydroxides, alkali carbonates, alkali bicarbonates, alkylamines, alkanolamines, and ammonia to said purified solution in an amount sufficient to precipitate chlortetracycline neutral base from said solution; and thereafter (d) recovering said precipitate from said solution.

References Cited

UNITED STATES PATENTS 3,037,973  6/1962  Sarcona et al. _____ 260—96.5
3,050,558  8/1962  Smith et al. _____ 260—96.5

OTHER REFERENCES

C. Kowarski, Chemical Abstracts, vol. 54, col. 14589h (1960).

LEON ZITVER, Primary Examiner

M. W. GLYNN, Assistant Examiner

U.S. Cl. X.R.

260—96.5 R